(12) United States Patent
Zhou et al.

(10) Patent No.: US 11,743,951 B2
(45) Date of Patent: Aug. 29, 2023

(54) TWO STEP RACH BASED L1/L2 INTER-CELL MOBILITY

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 17/443,754

(22) Filed: Jul. 27, 2021

(65) Prior Publication Data

US 2022/0039175 A1    Feb. 3, 2022

Related U.S. Application Data

(60) Provisional application No. 63/057,862, filed on Jul. 28, 2020.

(51) Int. Cl.
| | |
|---|---|
| *H04W 74/08* | (2009.01) |
| *H04W 36/00* | (2009.01) |
| *H04W 24/08* | (2009.01) |
| *H04W 74/00* | (2009.01) |

(52) U.S. Cl.
CPC ....... *H04W 74/0841* (2013.01); *H04W 24/08* (2013.01); *H04W 36/00837* (2018.08); *H04W 74/006* (2013.01)

(58) Field of Classification Search
CPC .......... H04W 24/08; H04W 36/00837; H04W 74/006; H04W 74/0833; H04W 74/0841
See application file for complete search history.

(56) References Cited

U.S. PATENT DOCUMENTS

| | | | | |
|---|---|---|---|---|
| 2013/0272132 | A1* | 10/2013 | Heo | H04W 28/0268 370/236.2 |
| 2015/0049712 | A1* | 2/2015 | Chen | H04W 74/0833 370/329 |
| 2018/0279182 | A1* | 9/2018 | Sang | H04W 74/0833 |
| 2020/0100299 | A1* | 3/2020 | Loehr | H04W 80/02 |
| 2020/0146069 | A1* | 5/2020 | Chen | H04B 17/327 |
| 2020/0396633 | A1* | 12/2020 | Tseng | H04W 24/10 |
| 2022/0014991 | A1* | 1/2022 | Zhou | H04W 36/0061 |
| 2022/0377586 | A1* | 11/2022 | Yang | H04W 24/04 |

* cited by examiner

*Primary Examiner* — Kashif Siddiqui
(74) *Attorney, Agent, or Firm* — Arun Swain

(57) ABSTRACT

Method and apparatus to configure a UE to initiate a two-step RACH process to perform a PCI selection process using L1/L2 messaging. The apparatus determines at least one target PCI in preparation of performing a PCI selection procedure. The apparatus selects a first target PCI that meets a threshold to initiate the PCI selection procedure. The apparatus transmits a first random access response message to the first target PCI. The apparatus monitors for a second random access response message from the first target PCI.

26 Claims, 14 Drawing Sheets

//TWO STEP RACH BASED L1/L2 INTER-CELL MOBILITY

CROSS REFERENCE TO RELATED APPLICATION(S)

This application claims the benefit of and priority to U.S. Provisional Application Ser. No. 63/057,862, entitled "Two Step RACH based L1/L2 Inter-Cell Mobility" and filed on Jul. 28, 2020, which is expressly incorporated by reference herein in its entirety.

TECHNICAL FIELD

The present disclosure relates generally to communication systems, and more particularly, to a configuration for a random access based inter-cell mobility.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus determines at least one target physical cell identifier (PCI) in preparation of performing a PCI selection procedure. The apparatus selects a first target PCI that meets a threshold to initiate the PCI selection procedure. The apparatus transmits a first random access response message to the first target PCI. The apparatus monitors for a second random access response message from the first target PCI.

In an aspect of the disclosure, a method, a computer-readable medium, and an apparatus are provided. The apparatus may be a device at a base station. The device may be a processor and/or a modem at a base station or the base station itself. The apparatus receives, from a user equipment (UE), a first random access response message for a first target physical cell identifier (PCI) to initiate a PCI selection procedure. The apparatus transmits, to the UE, a second random access response message from the first target PCI. The apparatus monitors for an uplink signal from the UE to complete the PCI selection procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
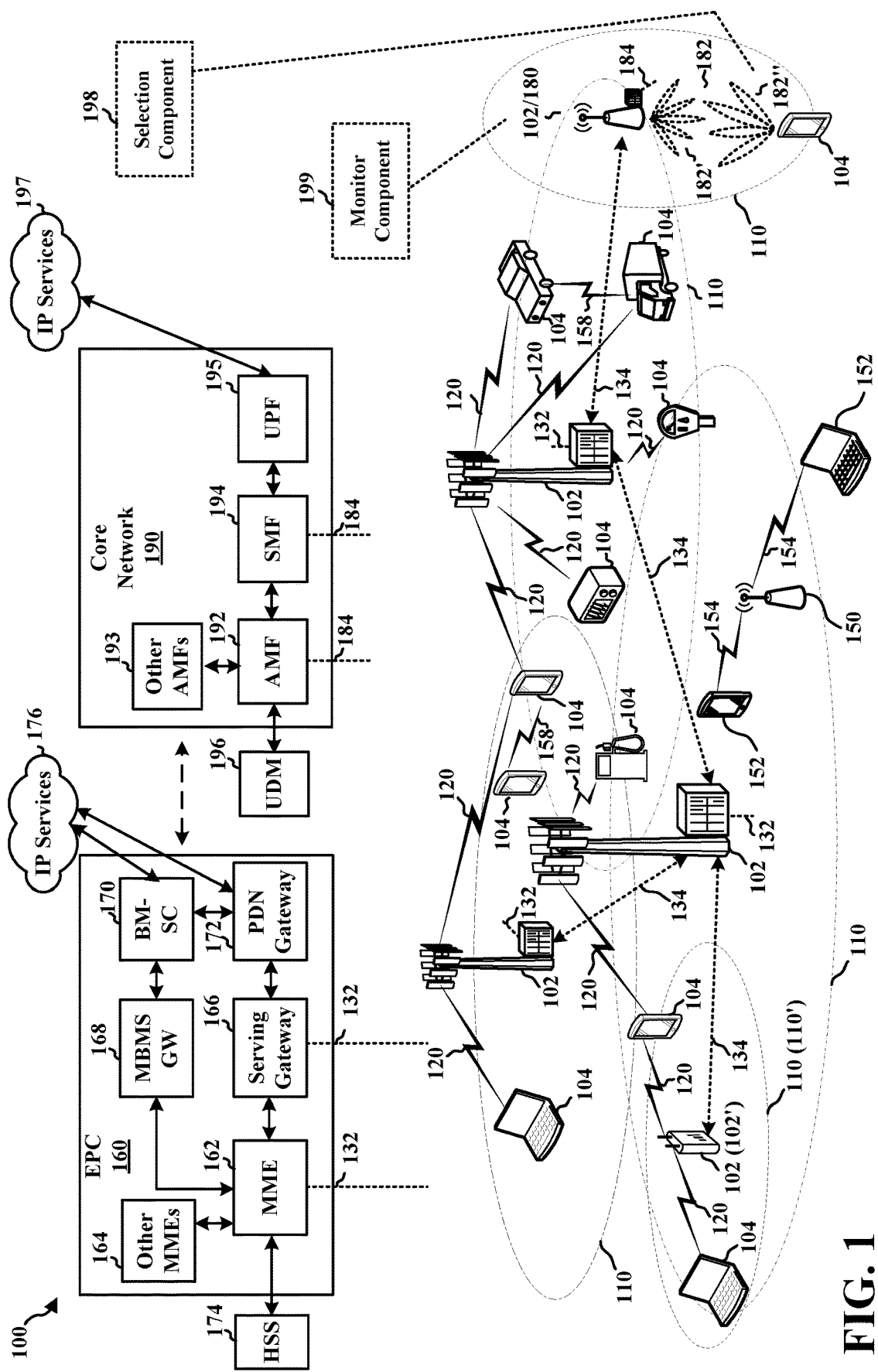
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to initiate a two-step RACH process to perform a PCI selection process using Layer1 (L1)/Layer2 (L2) messaging. For example, the UE 104 may comprise a selection component 198 configured to select a target PCI that meets a threshold. The UE 104 determines at least one target physical cell identifier (PCI) in preparation of performing a PCI selection procedure. The UE 104 selects a first target PCI that meets a threshold to initiate the PCI selection procedure. The UE 104 transmits a first random access response message to the first target PCI. The UE 104 monitors for a second random access response message from the first target PCI.

Referring again to FIG. 1, in certain aspects, the base station 180 may be configured to utilize a two-step RACH process to perform a PCI selection process using L1/L2 messaging. For example, the base station 180 may comprise a monitor component 199 configured to monitor for an uplink signal from a UE to complete a PCI selection procedure. The base station 180 receives, from a UE, a first random access response message for a first target PCI to initiate a PCI selection procedure. The base station 180 transmits, to the UE, a second random access response message from the first target PCI. The base station 180 monitors for an uplink signal from the UE to complete the PCI selection procedure.

Although the following description may be focused on 5G NR, the concepts described herein may be applicable to other similar areas, such as LTE, LTE-A, CDMA, GSM, and other wireless technologies.

Figure 2:
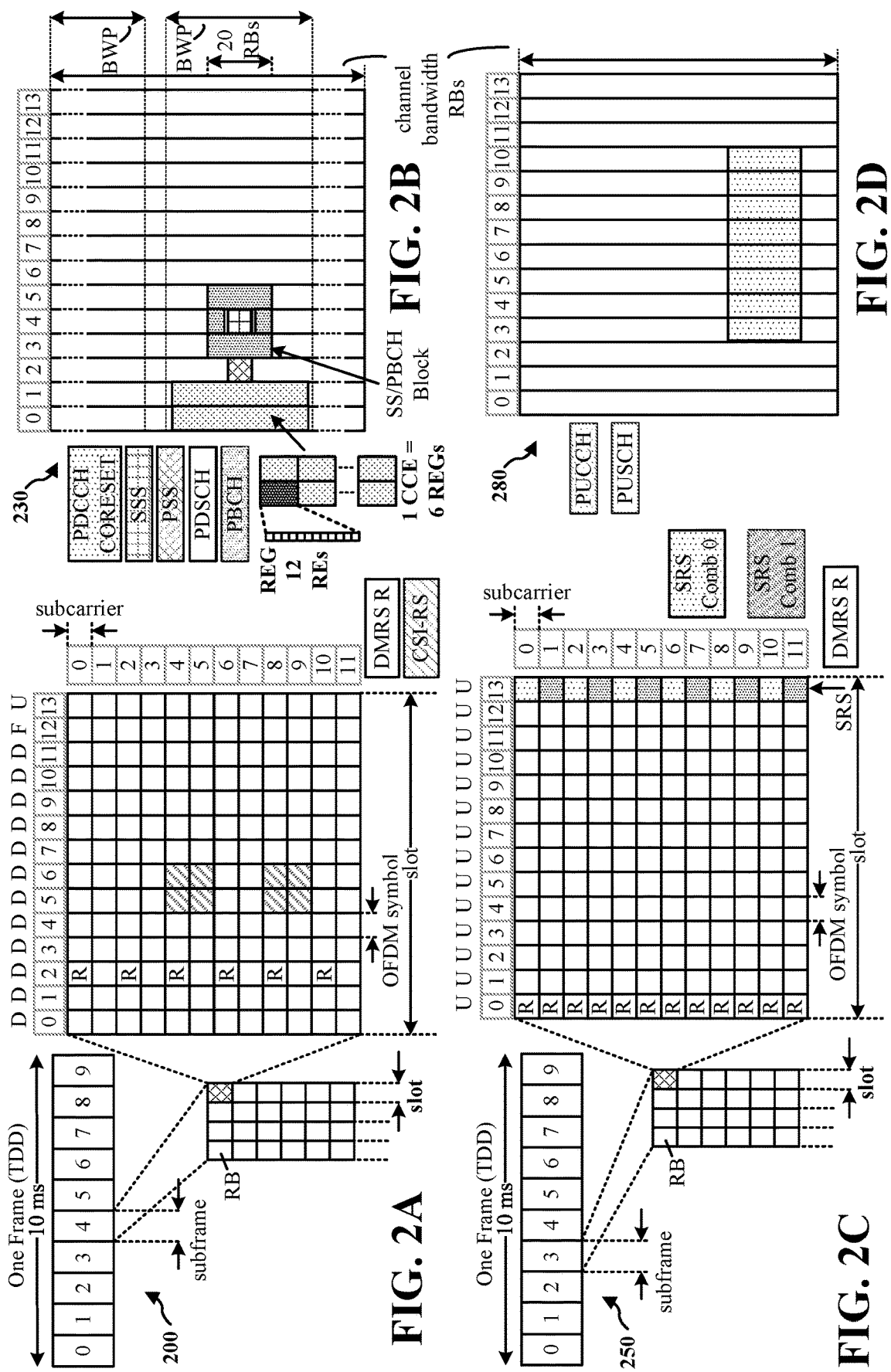
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
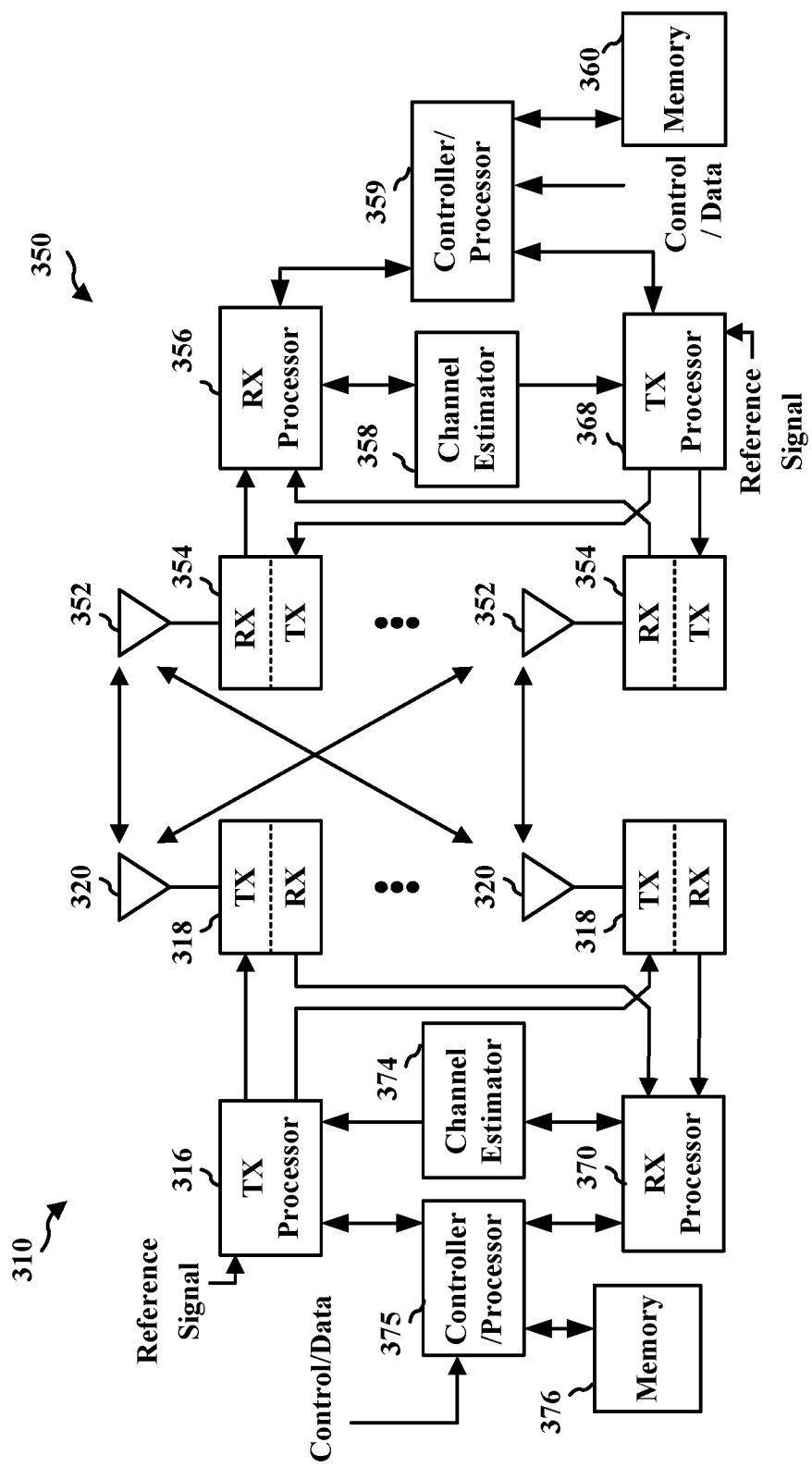
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Wireless communication systems may be configured to support L1/L2 inter-cell mobility initiated by a network (e.g., base station) or a UE. L1/L2 inter-cell mobility initiated by the network may reduce handover latency. In some instances, each serving cell may have multiple PCIs for remote radio headers (RRHs). The RRHs may be at different physical locations. The network may dynamically select a subset of PCIs of the same serving cell to serve the UE via L1/L2 signaling, e.g., DCI or MAC control element (CE) (MAC-CE). In some instances, each serving cell may have a single PCI. The network may dynamically select at least one serving cell to serve the UE via L1/L2 signaling.

Instead of a network initiated PCI selection, as discussed above, another option is a random access channel (RACH) based L1/L2 inter-cell mobility. At least one distinction between the network initiated L1/L2 inter-cell mobility and the RACH based L1/L2 inter-cell mobility is that a UE may select the one or more PCIs by itself. The UE may initiate a RACH procedure with the selected one or more target PCIs if a handover condition is satisfied for the selected one or more target PCIs. For example, the UE may be pre-configured with multiple candidate target PCIs by the network (e.g., via a base station). The network may also configure the UE to measure L1 metric per candidate target PCI. In some aspects, the L1 metric may include L1-reference signal received power (RSRP) and/or L1-signal to interference and noise ratio (SINR). The network may further configure handover condition per candidate target PCI. For example, the handover condition may use the L1 metric measured as an input. In instances where the handover condition is satisfied for a candidate target PCI, the UE may initiate a reconfiguration with synchronization or RACH procedure on uplink resources configured for the candidate target PCI. The RACH based L1/L2 handover may be completed after the handover message in L1/L2 signaling is sent from the UE to the RRH or cell associated with the target PCI or vice versa.

Figure 4:
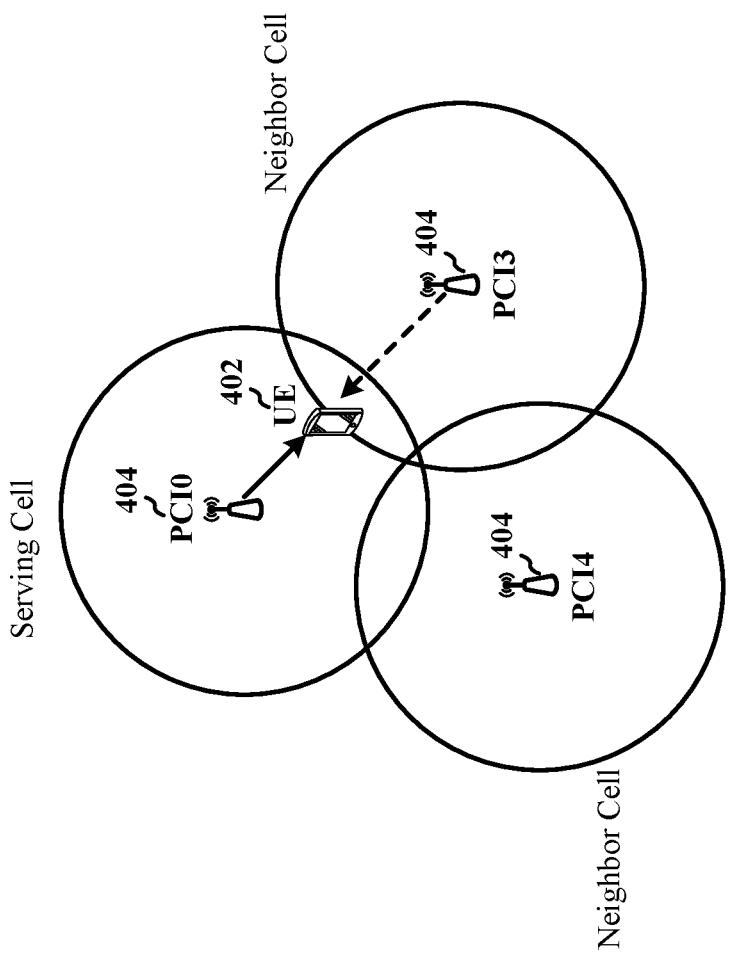
FIG. 4 is a diagram illustrating an example of a beam switching process.

FIG. 4 is a diagram 400 illustrating an example of a beam indication process. The diagram 400 includes a UE 402 and a plurality of base stations 404. The UE is being served by PCI0 that is associated with a base station 404, while PCI 3 and PCI4 are neighbor cells. In the diagram 400 of FIG. 4, L1/L2 inter-cell mobility may occur via beam switching across serving and non-serving cells. In some instances, each serving cell may have a single or multiple TRPs (e.g., base station) sharing the same PCI. In the example of FIG. 4 includes a configuration with a single TRP per serving cell. A TCI state or spatial relation for the downlink/uplink beam of the serving cell may be quasi co-located (QCL) with SSB from the PCI of the same serving cell or a neighbor non-serving cell. For example, as shown in FIG. 4, the TCI state may be QCL with the SSB from PCI0. In some instances, the neighbor non-serving cell may provide a beam indication.

Figure 5:
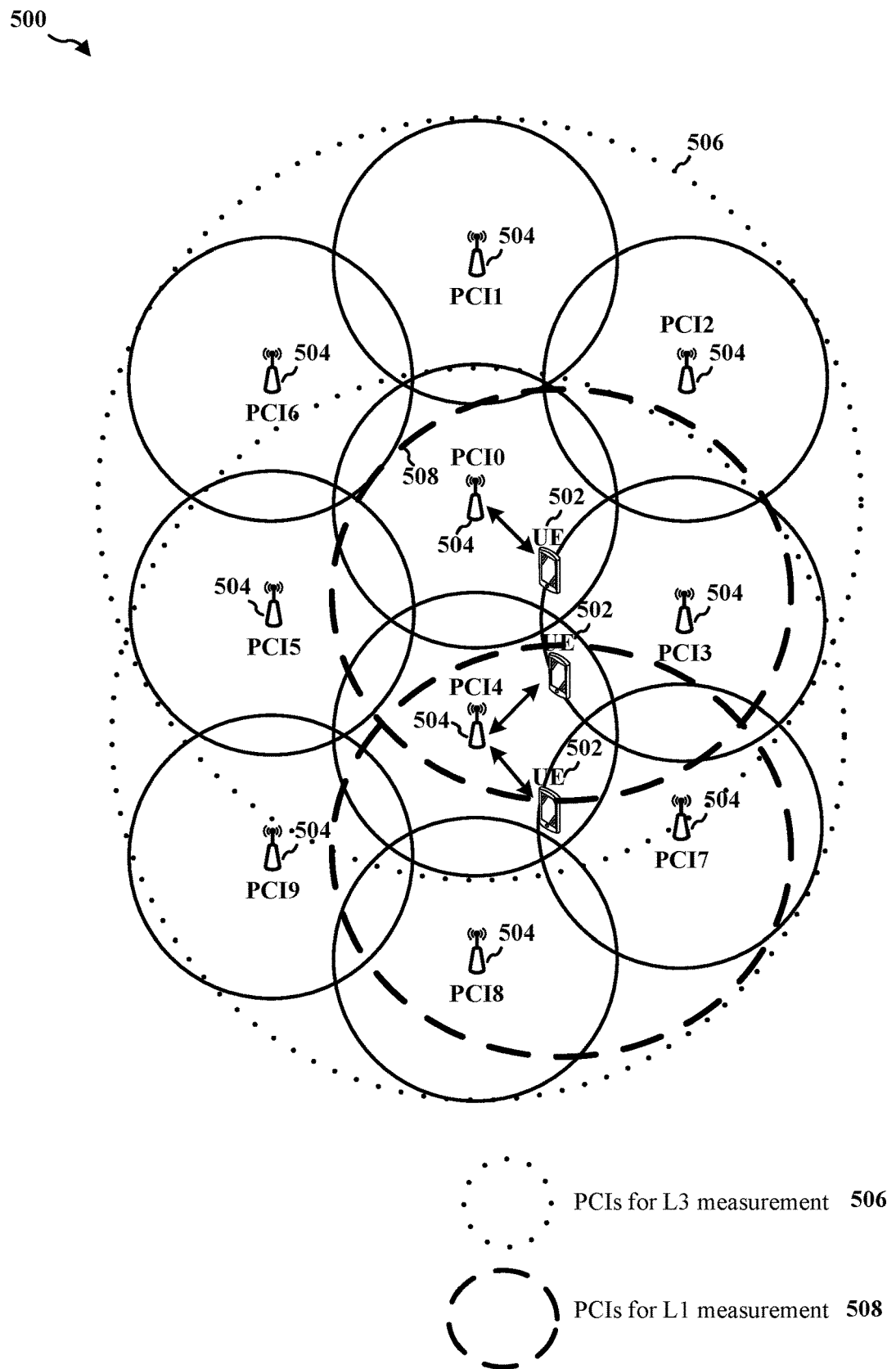
FIG. 5 is a diagram illustrating another example of the beam switching process.

FIG. 5 is a diagram 500 illustrating an example of the L1/L2 based inter-cell mobility process. The diagram 500 includes a UE 502 and a plurality of base station 504 and is configured similarly as the UE and the plurality of base stations of FIG. 4. For example, the UE 502 may enter a connected mode state after initial access (IA) on a serving cell with PCI0 504. The UE 502 may measure and report Layer3 (L3) metrics for the detected neighbor PCIs (e.g., PCI1-PCI6). The PCIs that may be included in the L3 measurement 506 may comprise PCI1-PCI6, as shown in FIG. 5. Based on the L3 measurements 506, the network may configure TCI states associated with a subset of the measured neighbor PCIs. For example, the network may configure TCI states associated with PCI0, PCI3, and PCI4, where PCI0, PCI3, and PCI4 are from neighbor non-serving cells. The UE may be further configured with L1 measurements for the configured TCI states. In some aspects, the PCIs (e.g., PCI0, PCI3, PCI4) may be defined as a set of PCIs for L1 measurement 508. For example, the UE may perform L1 measurements of PCI0, PCI3, and PCI4. Based on the L1 measurement, the network may activate a TCI state associated with a neighbor PCI to serve the UE 502. For example, based on the L1 measurements of PCI0, PCI3, and PCI4, the network may activate a TCI state associated with PCI4 to become a new serving cell for the UE 502. The UE may perform an updated L3 report. For example, the updated L3 report may include a different set of PCIs, e.g., PCI0, PCI3-PCI5, and PCI7-PCI5. Based on the updated L3 report, the network may move the serving cell from PCI0 to PCI4. The network may also configure new TCI states associated with the updated L1 measurement PCI set, e.g., PCI4, PCI7, and PCI8.

Aspects presented herein provide a RACH based L1/L2 inter-cell mobility which allows a UE to initiate a two-step RACH process to perform a PCI selection process using L1/L2 messaging. A UE may be configured to select a new PCI satisfying a cell selection condition and may initiate a two-step RACH if configured to an RRH/cell associated with the selected PCI. The RACH based L1/L2 inter-cell mobility disclosed herein may provide a L1/L2 handover procedure with reduced latency.

Figure 6:
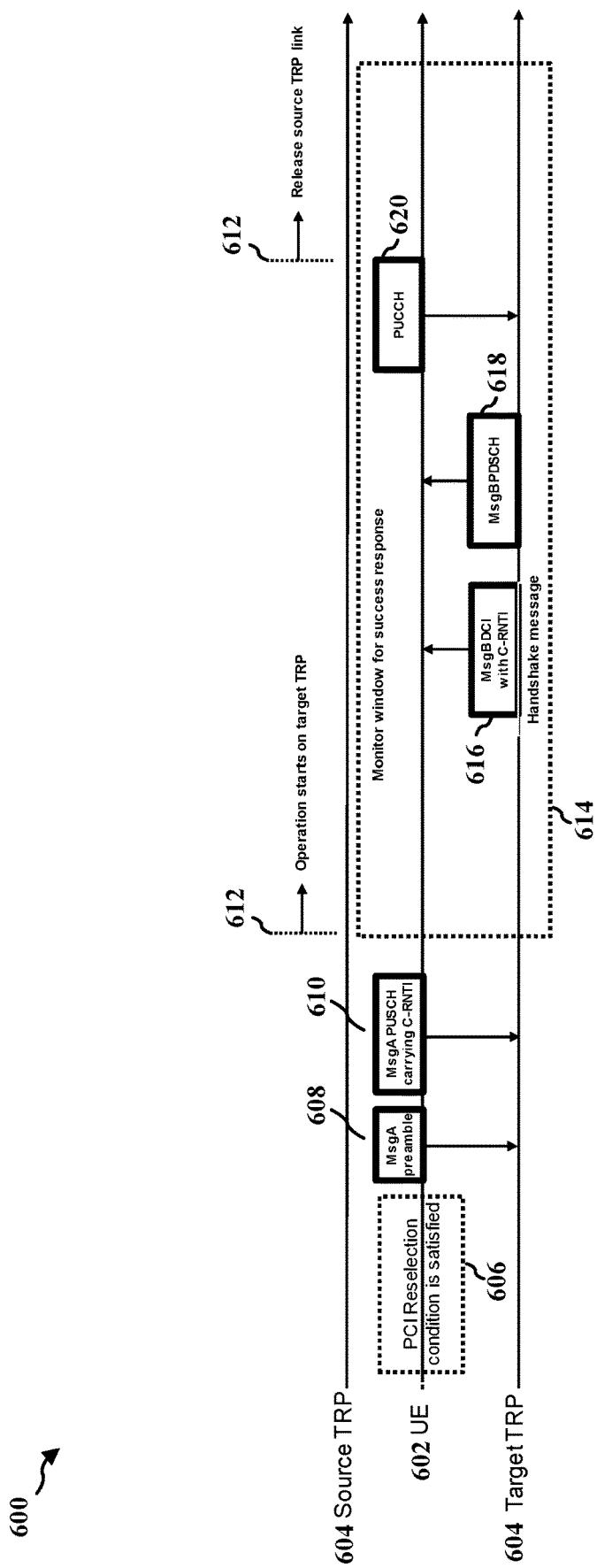
FIG. 6 is a diagram illustrating an example of a PCI selection process.

FIG. 6 is a diagram 600 illustrating an example of a PCI selection process. The diagram 600 includes a UE 602, a source base station (e.g., source TRP 604) and a target base station (e.g., target TRP 604). The UE 602, at 606, may determine that a PCI reselection condition has been satisfied. For example, the UE 602 may determine that L1 measurements for a PCI may satisfy the PCI selection condition. The UE 602 may initiate the two-step RACH procedure by transmitting a first random access message to the target TRP 604. The first random access message may comprise a preamble and a payload. The preamble may comprise messageA (MsgA) preamble 608. The MsgA 608 may be transmitted to the target TRP 604 after the UE determines that a selected PCI meets the PCI selection conditions. For example, a candidate target TRP may have L1 cell level RSRP greater than the source TRP. The MsgA payload 610 may include a C-RNTI within a MsgA PUSCH.

After the MsgA PUSCH 610 has been transmitted to the target TRP 604, the PCI selection process start on the target TRP (e.g., 612). After the transmission of the MsgA PUSCH 610, the UE 602 may monitor for a second random access response message from the target TRP 604. The UE 602 may monitor for the second random access response message from the target TRP 604 within a time window 614. The second random access response message may comprise a messageB (MsgB) DCI 616 and a MsgB PDSCH 618. The MsgB DCI may include a C-RNTI. The MsgB DCI 616 may serve as a handshake message from the target TRP, such that the DCI may schedule a MsgB PDSCH 618 and a PUCCH 620 in order to complete the PCI selection process. The UE 602, after receipt of the MsgB DCI 616 and MsgB PDSCH 618, may transmit the PUCCH 620. The UE 602 may then stop monitoring the source TRP 604 and may release the link with the source TRP 604, at 612. The UE 602 may start monitoring the target TRP 604, which will become the new source TRP. The diagram 600 of FIG. 6 provides an example of a successful PCI selection process.

Figure 7:
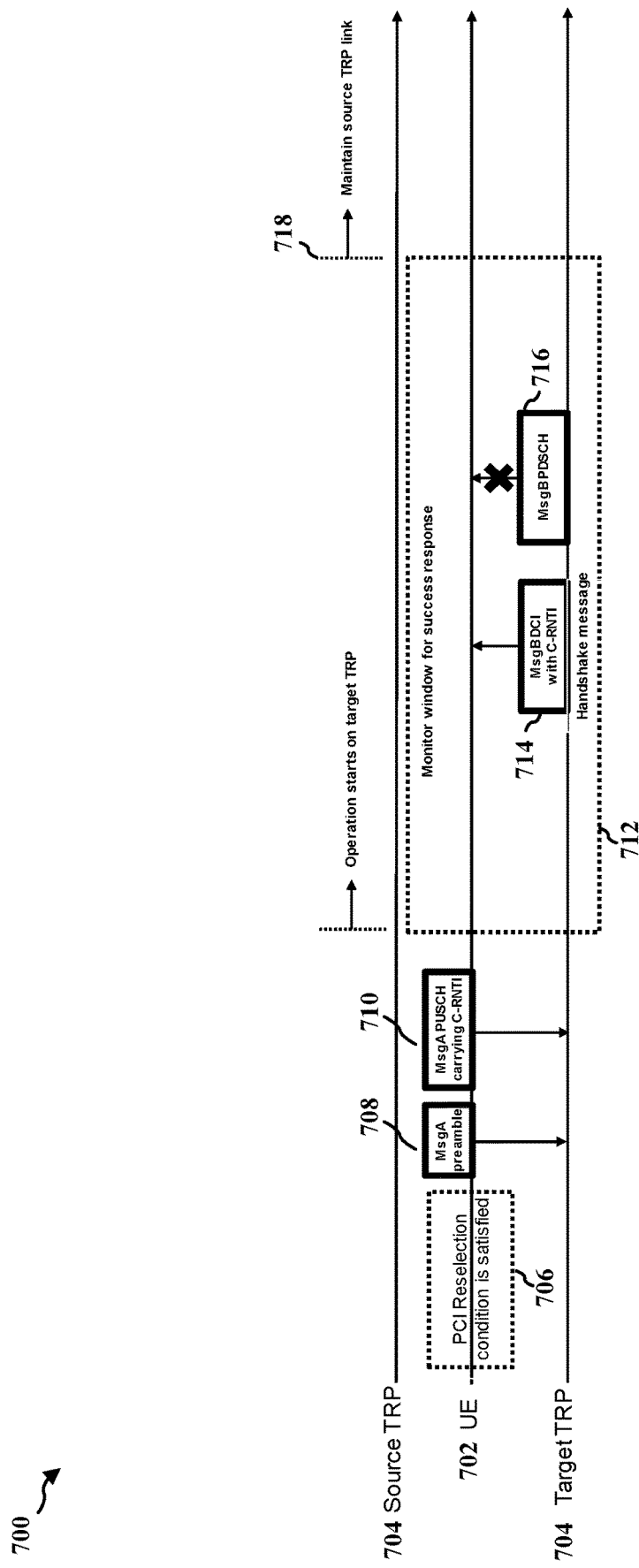
FIG. 7 is a diagram illustrating another example of the PCI selection process.

FIG. 7 is a diagram 700 illustrating an example of the PCI selection process. The diagram 700 includes a UE 702, a source base station (e.g., source TRP 704) and a target base station (e.g., target TRP 704), and are configured similarly as in FIG. 6. However, the diagram 700 of FIG. 7 discloses an example of fallback operation due to a PCI selection failure. The UE may determine, at 706, that the PCI reselection condition is satisfied, in a manner similar to 606 of FIG. 6. The UE may also transmit the first random access response message comprised of MsgA preamble 708 and MsgA PUSCH 710, in a manner similar to 608 and 610 of FIG. 6. The UE 702 monitors for the second random access response message from the target TRP 704 within the monitor window 712. The second random access response message may comprise the MsgB DCI 714 and the MsgB PDSCH 716. The target TRP 704 may transmit the MsgB DCI 714 which may schedule the MsgB PDSCH 716 and an uplink signal to complete the PCI selection process. However, in some instances, the UE 702 may not receive the MsgB PDSCH 716 from the target TRP 704 within the monitor window 712. In such instances, the UE 702, at 718, may continue to monitor the source TRP 704 and may re-initiate the two-step RACH procedure. The UE 702 may retransmit the first random access response message a certain number of times in an effort to successfully complete the PCI selection process. After which the UE 702 may inform the source TRP 702 a PCI selection failure. In the event of a PCI selection failure, the UE 702 may attempt a conditional handover if the corresponding condition is satisfied.

Figure 8:
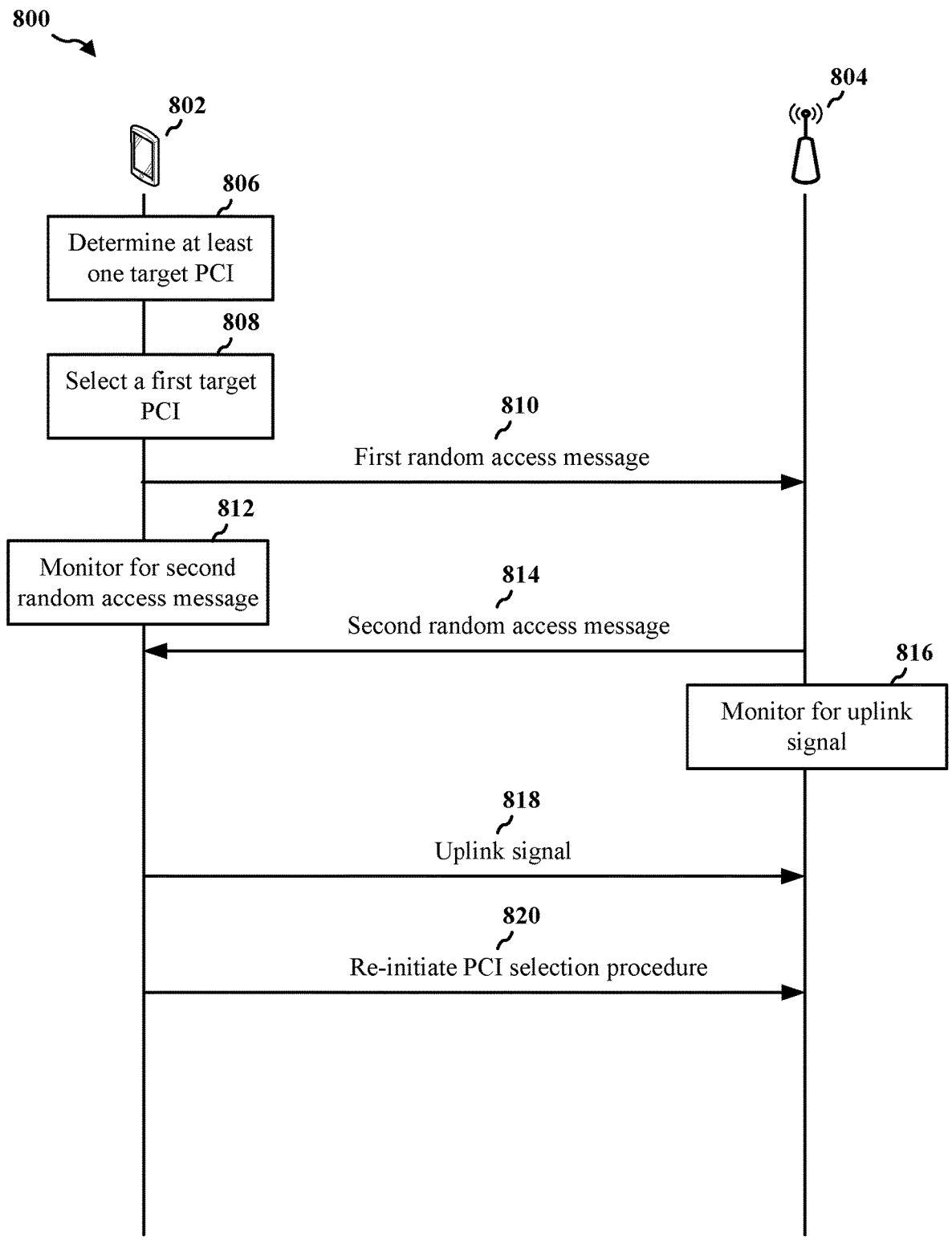
FIG. 8 is a call flow diagram of signaling between a UE and a base station in accordance with certain aspects of the disclosure.

FIG. 8 is a call flow diagram 800 of signaling between a UE 802 and a base station 804. The base station 804 may be configured to provide a cell. The UE 802 may be configured to communicate with the base station 804. For example, in the context of FIG. 1, the base station 804 may correspond to base station 102/180 and, accordingly, the cell may include a geographic coverage area 110 in which communication coverage is provided and/or small cell 102' having a coverage area 110'. Further, a UE 802 may correspond to at least UE 104. In another example, in the context of FIG. 3, the base station 804 may correspond to base station 310 and the UE 802 may correspond to UE 350. Optional aspects are illustrated with a dashed line.

As illustrated at 806, the UE 802 may determine at least one target physical cell identifier (PCI). The UE 802 may determine the at least one target PCI in preparation of performing a PCI selection procedure. The at least one target PCI may be associated with the base station 804. In some aspects, each serving cell may comprise a plurality of PCIs for remote radio headers (RRHs). The RRHs may be at different physical locations. In some aspects, each serving cell may comprise a single PCI.

As illustrated at 808, the UE 802 may select a first target PCI. The UE 802 may select the first target PCI that meets a threshold to initiate the PCI selection procedure. The first target PCI being associated with the base station 804.

As illustrated at 810, the UE 802 may transmit a first random access response message. The UE 802 may transmit the first random access response message to the first target PCI. The base station 804 may receive the first random access response message for a first target PCI. The base station may receive the first random access response message from the UE 802. The base station 804 may receive the first random access response message from the UE 802 to initiate a PCI selection procedure. In some aspects, the first random access response message may comprise a preamble and a payload. The payload may be carried via a physical uplink shared channel (PUSCH). The payload may comprise an assigned cell radio network temporary identifier (C-RNTI) for the first target PCI.

As illustrated at 812, the UE 802 may monitor for a second random access response message. The UE 802 may monitor for the second random access response message from the first target PCI. In some aspects, the second random access response message may comprise a physical downlink control channel (PDCCH) and a physical downlink shared channel (PDSCH) on a cell associated with the first target PCI.

As illustrated at 814, the base station 804 may transmit a second random access response message. The base station 804 may transmit the second random access response message to the UE 802. The base station 804 may transmit the second random access response message from the first target PCI. The UE 802 may receive the second random access response message from the first target PCI associated with the base station 804 within a monitor window. In some aspects, the second random access response message comprises a PDCCH and a PDSCH on a cell associated with the first target PCI. In some aspects, the second random access response message may comprise a DCI and a payload. The payload may be carried via PDSCH. The DCI of the second random access response message may include an assigned C-RNTI for the first target PCI. The DCI may serve as handshake message from the target PCI. The handshake message of the DCI may configure the UE 802 to complete the PCI selection process, such that the UE 802 releases the link with a source PCI and establishes a link with the target PCI. The DCI of the second random access response message may be within a PDCCH associated with the first target PCI. The DCI of the second random access response message may schedule a transmission of the uplink signal to the first target PCI. The payload of the second random access response message may provide an indication to the UE 802 of a successful response to the PCI selection procedure initiated by the first random access response message. The payload of the second random access response message may be carried via the PDSCH. In some aspects, the payload of the second random access response message may be received by the UE 802 within the monitor window. The monitor window may begin after transmission of the first random access response message.

As illustrated at 816, the base station 804 may monitor for an uplink signal from the UE 802. The base station 804 may monitor for the uplink signal from the UE 802 to complete the PCI selection procedure.

As illustrated at 818, the UE 802 may transmit an uplink signal to the first target PCI associated with the base station 804. The UE 802 may transmit the uplink signal to the first target PCI upon receipt of the second random access response message. The base station 804 may receive the uplink signal from the UE 802 in response to transmitting the second random access response message. In some aspects, the uplink signal comprises a physical uplink control channel (PUCCH) or a physical uplink shared channel (PUSCH). In some aspects, the UE 802 may stop monitoring a source PCI and may release a link to the source PCI upon transmission of the uplink signal to the first target PCI.

In some aspects, the UE 802 may determine that the second random access response message is received with a monitor window. The UE 802 may determine that the second random access response message is received from the first target PCI associated with the base station 804 within the monitor window. If the second random access response message from the first target PCI is not received within the monitor window, the UE 802 may continue to monitor a source PCI. In some aspects, the UE 802 may maintain a link with the source PCI. The source PCI is the current serving cell and may be associated with the base station 804 or may be associated with a different base station.

As illustrated at 820, the UE 802 may re-initiate the PCI selection procedure if the second random access response message from the first target PCI is not received within the monitor window. The UE 802 may re-initiate the PCI selection procedure by retransmitting the first random access response message to the first target PCI. The base station 804 may receive the retransmission of the first random access response message from the UE 802 which may re-initiate the PCI selection procedure. In some aspects, the first random access response message may be retransmitted up to a maximum number of times until success in order to perform the PCI selection procedure. The UE 802 may inform the source PCI of a failure of the PCI selection procedure, if the first random access response message is retransmitted for the maximum number of times. In some aspects, the UE 802 may perform a conditional handover procedure if the first target PCI satisfies a conditional handover threshold.

Figure 9:
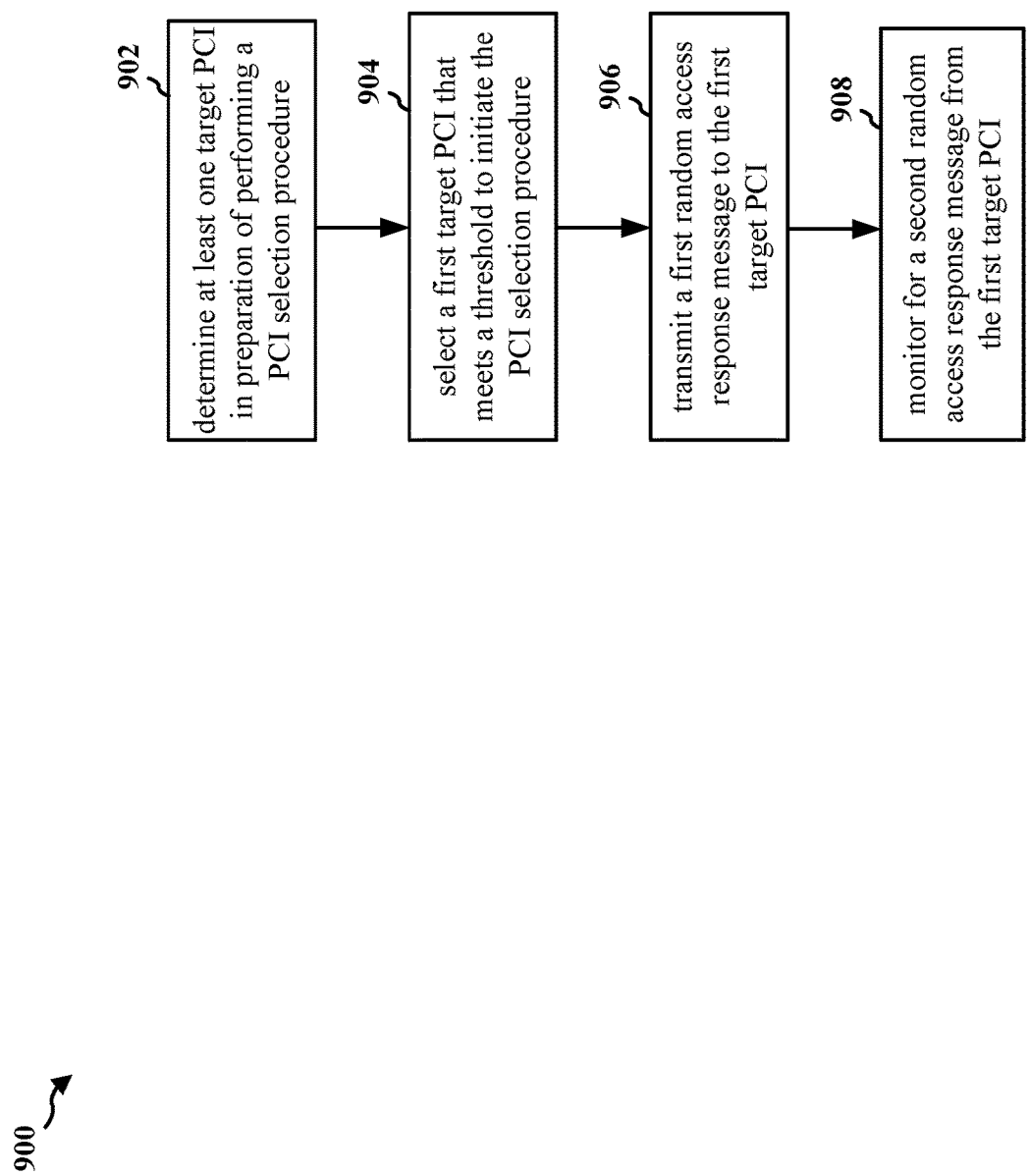
FIG. 9 is a flowchart of a method of wireless communication.

FIG. 9 is a flowchart 900 of a method of wireless communication. The method may be performed by a UE or a component of a UE (e.g., the UE 104, 402, 502, 602, 702, 802; the apparatus 1102; the cellular baseband processor 1104, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure a UE to initiate a two-step RACH process to perform a PCI selection process using L1/L2 messaging.

At 902, the UE may determine at least one target physical cell identifier (PCI). For example, 902 may be performed by determination component 1140 of apparatus 1102. The UE may determine the at least one target PCI in preparation of performing a PCI selection procedure. In some aspects, each serving cell may comprise a plurality of PCIs for remote radio headers (RRHs). The RRHs may be at different physical locations. In some aspects, each serving cell may comprise a single PCI. In the context of FIG. 8, the UE 802, at 806, may determine at least one target PCI.

At 904, the UE may select a first target PCI. For example, 904 may be performed by selection component 1142 of apparatus 1102. The UE may select the first target PCI that meets a threshold to initiate the PCI selection procedure. In the context of FIG. 8, the UE 802, at 808, may select a first target PCI.

At 906, the UE may transmit a first random access response message. For example, 906 may be performed by $1^{st}$ random access component 1144 of apparatus 1102. The UE may transmit the first random access response message to the first target PCI. In some aspects, the first random access response message may comprise a preamble and a payload. The payload may be carried via a physical uplink shared channel (PUSCH). The payload may comprise an assigned cell radio network temporary identifier (C-RNTI) for the first target PCI. In the context of FIG. 8, the UE 802, at 810, may transmit a first random access response message.

At 908, the UE may monitor for a second random access response message. For example, 908 may be performed by monitor component 1146 of apparatus 1102. The UE may monitor for the second random access response message from the first target PCI. In some aspects, the second random access response message may comprise a physical downlink control channel (PDCCH) and a physical downlink shared channel (PDSCH) on a cell associated with the first target PCI. In the context of FIG. 8, the UE 802, at 812, may monitor for a second random access response message.

Figure 10:
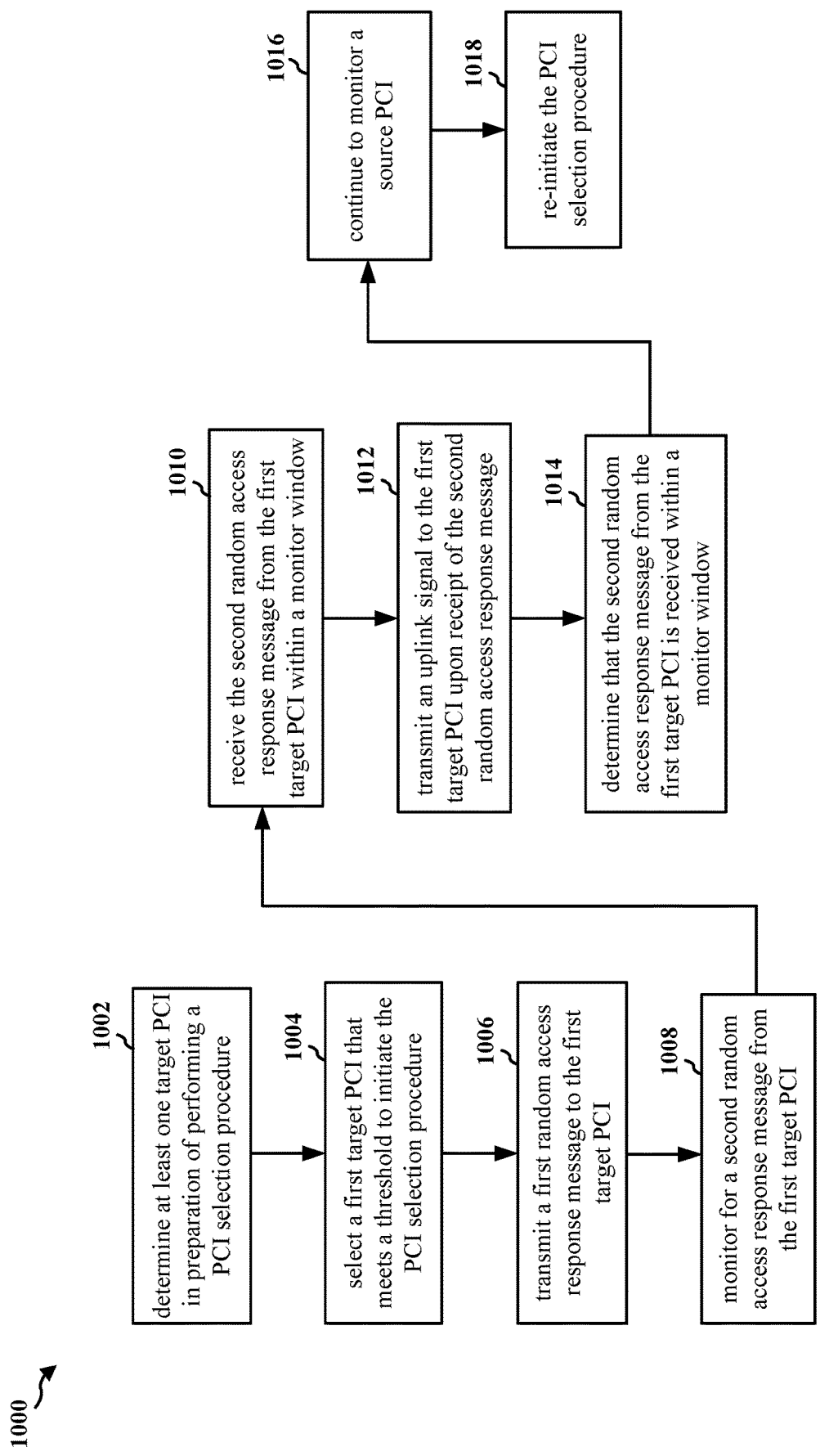
FIG. 10 is a flowchart of a method of wireless communication.

FIG. 10 is a flowchart 1000 of a method of wireless communication. The method may be performed by a UE or a component of a UE (e.g., the UE 104, 402, 502, 602, 702, 802; the apparatus 1102; the cellular baseband processor 1104, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure a UE to initiate a two-step RACH process to perform a PCI selection process using L1/L2 messaging.

At 1002, the UE may determine at least one target PCI. For example, 1002 may be performed by determination component 1140 of apparatus 1102. The UE may determine the at least one target PCI in preparation of performing a PCI selection procedure. In some aspects, each serving cell may comprise a plurality of PCIs for RRHs. The RRHs may be at different physical locations. In some aspects, each serving cell may comprise a single PCI. In the context of FIG. 8, the UE 802, at 806, may determine at least one target PCI.

At 1004, the UE may select a first target PCI. For example, 1004 may be performed by selection component 1142 of apparatus 1102. The UE may select the first target PCI that meets a threshold to initiate the PCI selection procedure. In the context of FIG. 8, the UE 802, at 808, may select a first target PCI.

At 1006, the UE may transmit a first random access response message. For example, 1006 may be performed by $1^{st}$ random access component 1144 of apparatus 1102. The UE may transmit the first random access response message to the first target PCI. In some aspects, the first random access response message may comprise a preamble and a payload. The payload may be carried via a PUSCH. The payload may comprise an assigned C-RNTI for the first target PCI. In the context of FIG. 8, the UE 802, at 810, may transmit a first random access response message.

At 1008, the UE may monitor for a second random access response message. For example, 1008 may be performed by monitor component 1146 of apparatus 1102. The UE may monitor for the second random access response message from the first target PCI. In some aspects, the second random access response message may comprise a PDCCH and a PDSCH on a cell associated with the first target PCI. In the context of FIG. 8, the UE 802, at 812, may monitor for a second random access response message.

At 1010, the UE may receive the second random access response message from the first target PCI within a monitor window. For example, 1010 may be performed by $2^{nd}$ random access component 1148 of apparatus 1102. The second random access response message may comprise a downlink control information (DCI) and a payload. The payload may be carried via PDSCH. In some aspects, the DCI of the second random access response message includes an assigned C-RNTI for the first target PCI. The DCI may serve as handshake message from the target PCI. The DCI of the second random access response message may be within a PDCCH associated with the first target PCI. The DCI of the second random access response message schedules a transmission of the uplink signal to the first target PCI. In some aspects, the payload of the second random access response message may provide an indication to the UE of a successful response to the PCI selection procedure initiated by the first random access response message. The payload of the second random access response message may be carried via the PDSCH. In some aspects, the payload of the second random access response message may be received by the UE within the monitor window. The monitor window may begin after transmission of the first random access response message. In the context of FIG. 8, the UE 802, at 814, may receive the second random access response message from the first target PCI within a monitor window.

At 1012, the UE may transmit an uplink signal to the first target PCI. For example, 1012 may be performed by uplink component 1150 of apparatus 1102. The UE may transmit the uplink signal to the first target PCI upon receipt of the second random access response message. In some aspects, the uplink signal comprises a PUCCH or a PUSCH. In some aspects, the UE may stop monitoring a source PCI and may release a link to the source PCI upon transmission of the uplink signal to the first target PCI. In the context of FIG. 8, the UE 802, at 818, may transmit an uplink signal to the first target PCI.

At 1014, the UE may determine that the second random access response message is received with a monitor window. For example, 1014 may be performed by window component 1152 of apparatus 1102. The UE may determine that the second random access response message is received from the first target PCI within the monitor window.

At 1016, if the second random access response message from the first target PCI is not received within the monitor window, the UE may continue to monitor a source PCI. For example, 1016 may be performed by monitor component 1146 of apparatus 1102. In some aspects, the UE may maintain a link with the source PCI.

At 1018, the UE may re-initiate the PCI selection procedure if the second random access response message from the first target PCI is not received within the monitor window. For example, 1018 may be performed by $1^{st}$ random access component 1144 of apparatus 1102. The UE may re-initiate the PCI selection procedure by retransmitting the first random access response message to the first target PCI. In some aspects, the first random access response message may be retransmitted up to a maximum number of times until success in order to perform the PCI selection procedure. The UE may inform the source PCI of a failure of the PCI selection procedure, if the first random access response message is retransmitted for the maximum number of times. In some aspects, the UE may perform a conditional handover procedure if the first target PCI satisfies a conditional handover threshold. In the context of FIG. 8, the UE 802, at 820, may re-initiate the PCI selection procedure if the second random access response message from the first target PCI is not received within the monitor window.

Figure 11:
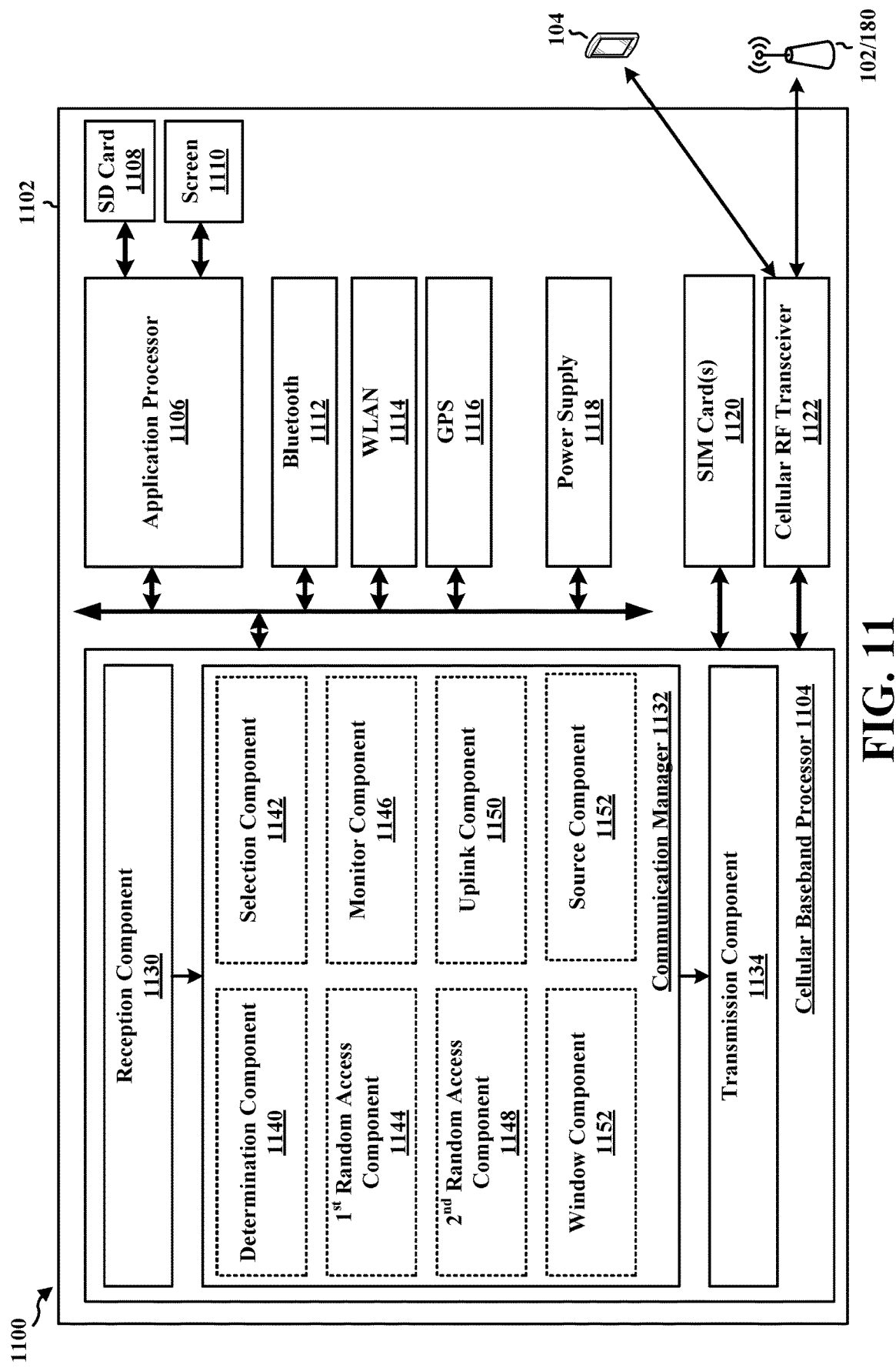
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a determination component 1140 that is configured to determine at least one target PCI, e.g., as described in connection with 902 of FIG. 9 or 1002 of FIG. 10. The communication manager 1132 further includes a selection component 1142 that is configured to select a first target PCI, e.g., as described in connection with 904 of FIG. 9 or 1004 of FIG. 10. The communication manager 1132 further includes a $1^{st}$ random access component 1144 that is configured to transmit a first random access response message, e.g., as described in connection with 906 of FIG. 9 or 1006 of FIG. 10. The $1^{st}$ random access component 1144 may be configured to re-initiate the PCI selection procedure if the second random access response message from the first target PCI is not received within the monitor window, e.g., as described in connection with 1018 of FIG. 10. The communication manager 1132 further includes a monitor component 1146 that is configured to monitor for a second random access response message, e.g., as described in connection with 908 of FIG. 9 or 1008 of FIG. 10. The monitor component 1146 may be configured to continue to monitor a source PCI, e.g., as described in connection with 1016 of FIG. 10. The communication manager 1132 further includes a $2^{nd}$ random access component 1148 that is configured to receive the second random access response message from the first target PCI within a monitor window, e.g., as described in connection with 1010 of FIG. 10. The communication manager 1132 further includes an uplink component 1150 that is configured to transmit an uplink signal to the first target PCI, e.g., as described in connection with 1012 of FIG. 10. The communication manager 1132 further includes a window component 1152 that is configured to determine that the second random access response message is received with a monitor window, e.g., as described in connection with 1014 of FIG. 10.

The apparatus may include additional components that perform each of the blocks of the algorithm in the flowcharts of FIG. 9 or 10. As such, each block in the flowcharts of FIG. 9 or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for determining at least one target PCI in preparation of performing a PCI selection procedure. The apparatus includes means for selecting a first target PCI that meets a threshold to initiate the PCI selection procedure. The apparatus includes means for transmitting a first random access response message to the first target PCI. The apparatus includes means for monitoring for a second random access response message from the first target PCI. The apparatus further includes means for receiving the second random access response message from the first target PCI within a monitor window. The second random access response message comprising a DCI and a payload. The payload is carried via PDSCH. The apparatus further includes means for transmitting an uplink signal to the first target PCI upon receipt of the second random access response message. The apparatus further includes means for determining that the second random access response message from the first target PCI is received within a monitor window. The apparatus further includes means for continuing to monitor a source PCI. The apparatus further includes means for re-initiating the PCI selection procedure by retransmitting the first random access response message to the first target PCI. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
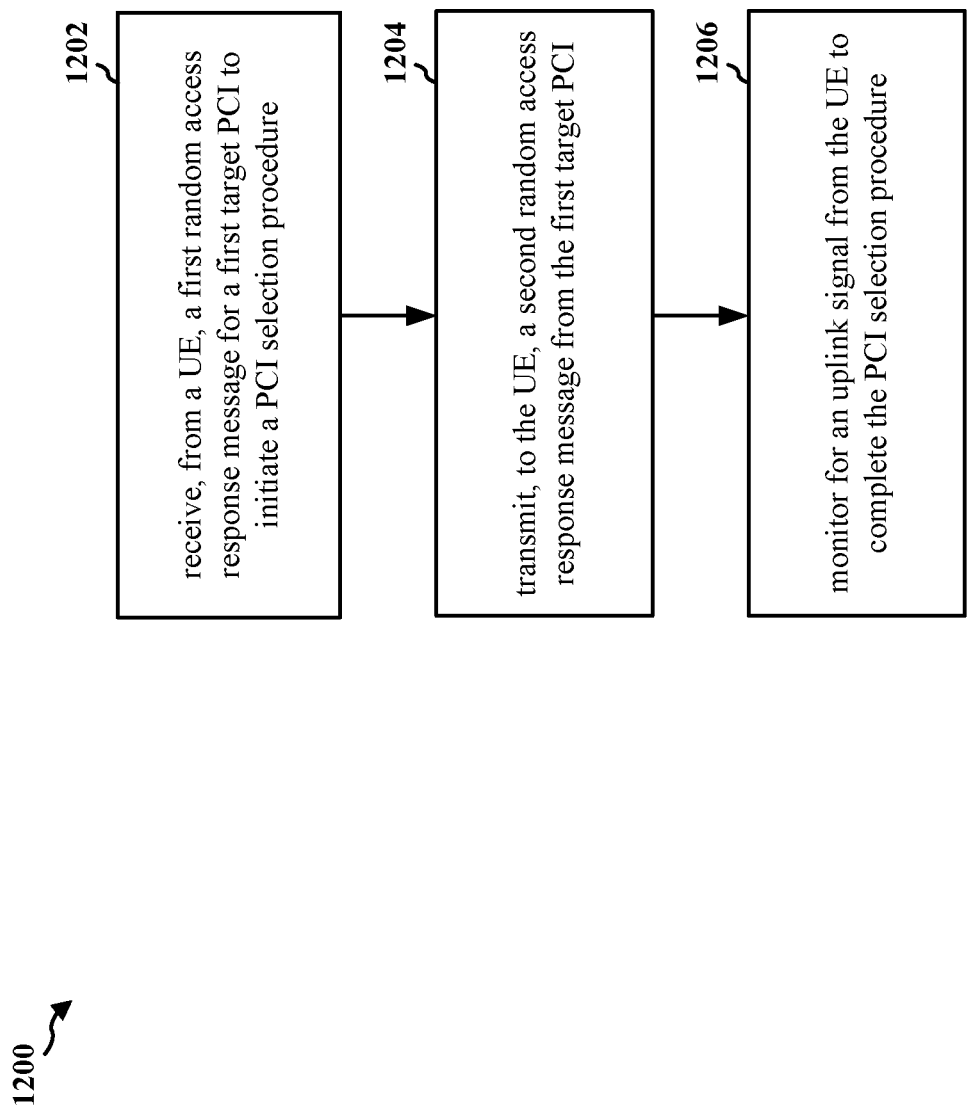
FIG. 12 is a flowchart of a method of wireless communication.

FIG. 12 is a flowchart 1200 of a method of wireless communication. The method may be performed by a base station or a component of a base station (e.g., the base station 102/180, 404, 504, 604, 704, 804; the apparatus 1402; the baseband unit 1404, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may configure a base station to utilize a two-step RACH process to perform a PCI selection process using L1/L2 messaging.

At 1202, the base station may receive a first random access response message for a first target PCI. For example, 1202 may be performed by $1^{st}$ random access component 1440 of apparatus 1402. The base station may receive the first random access response message from a UE. The base station may receive the first random access response message from the UE to initiate a PCI selection procedure. In some aspects, the first random access response message may comprise a preamble and a payload. The payload may be carried via a PUSCH. The payload may comprise an assigned C-RNTI for the first target PCI. In some aspects, each serving cell comprises a plurality of PCIs for RRHs. The RRHs are at different physical locations. In some aspects, each serving cell may comprise a single PCI. In the context of FIG. 8, the base station 804, at 810, may receive a first random access response message for a first target PCI. may receive a first random access response message for a first target PCI.

At 1204, the base station may transmit a second random access response message. For example, 1204 may be performed by $2^{nd}$ random access component 1442 of apparatus 1402. The base station may transmit the second random access response message to the UE. The base station may transmit the second random access response message from the first target PCI. In some aspects, the second random access response message comprises a PDCCH and a PDSCH on a cell associated with the first target PCI. In some aspects, the second random access response message may comprise a DCI and a payload. The payload may be carried via PDSCH. The DCI of the second random access response message may include an assigned C-RNTI for the first target PCI. The DCI may serve as handshake message from the target PCI. The DCI of the second random access response message may be within a PDCCH associated with the first target PCI. The DCI of the second random access response message may schedule a transmission of the uplink signal to the first target PCI. The payload of the second random access response message may provide an indication to the UE of a successful response to the PCI selection procedure initiated by the first random access response message. The payload of the second random access response message may be carried via the PDSCH. In some aspects, the payload of the second random access response message may be received by the UE within the monitor window. The monitor window may begin after transmission of the first random access response message. In the context of FIG. 8, the base station 804, at 814, may transmit a second random access response message.

At 1206, the base station may monitor for an uplink signal from the UE. For example, 1206 may be performed by monitor component 1444 of apparatus 1402. The base station may monitor for the uplink signal from the UE to complete the PCI selection procedure. In the context of FIG. 8, the base station 804, at 816, may monitor for an uplink signal from the UE 802.

Figure 13:
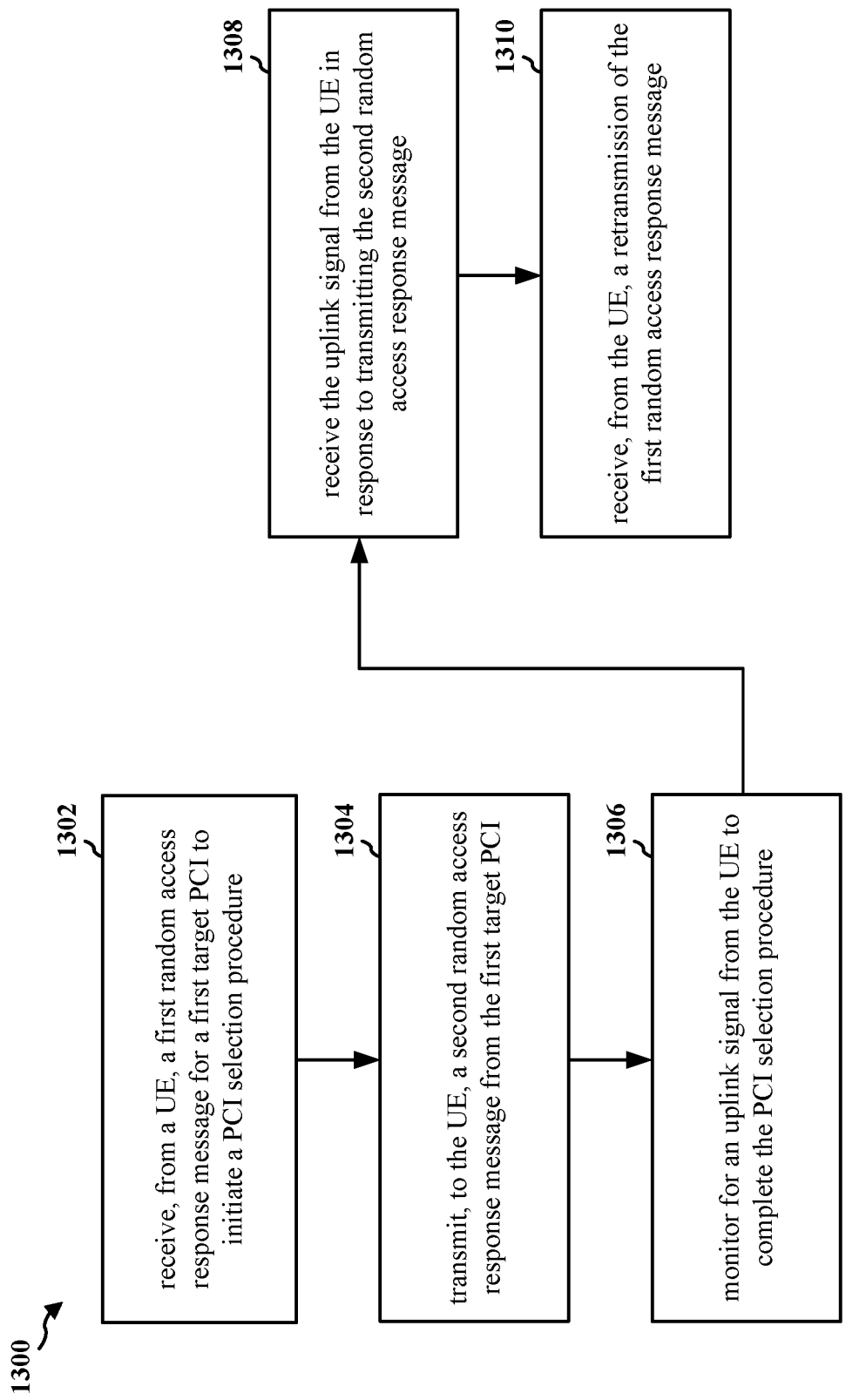
FIG. 13 is a flowchart of a method of wireless communication.

FIG. 13 is a flowchart 1300 of a method of wireless communication. The method may be performed by a base station or a component of a base station (e.g., the base station 102/180, 404, 504, 604, 704, 804; the apparatus 1402; the baseband unit 1404, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may configure a base station to utilize a two-step RACH process to perform a PCI selection process using L1/L2 messaging.

At 1302, the base station may receive a first random access response message for a first target PCI. For example, 1302 may be performed by $1^{st}$ random access component 1440 of apparatus 1402. The base station may receive the first random access response message from a UE. The base station may receive the first random access response message from the UE to initiate a PCI selection procedure. In some aspects, the first random access response message may comprise a preamble and a payload. The payload may be carried via a PUSCH. The payload may comprise an assigned C-RNTI for the first target PCI. In some aspects, each serving cell comprises a plurality of PCIs for RRHs. The RRHs are at different physical locations. In some aspects, each serving cell may comprise a single PCI. In the context of FIG. 8, the base station 804, at 810, may receive a first random access response message for a first target PCI. may receive a first random access response message for a first target PCI.

At 1304, the base station may transmit a second random access response message. For example, 1304 may be performed by $2^{nd}$ random access component 1442 of apparatus 1402. The base station may transmit the second random access response message to the UE. The base station may transmit the second random access response message from the first target PCI. In some aspects, the second random access response message comprises a PDCCH and a PDSCH on a cell associated with the first target PCI. In some aspects, the second random access response message may comprise a DCI and a payload. The payload may be carried via PDSCH. The DCI of the second random access response message may include an assigned C-RNTI for the first target PCI. The DCI may serve as handshake message from the target PCI. The DCI of the second random access response message may be within a PDCCH associated with the first target PCI. The DCI of the second random access response message may schedule a transmission of the uplink signal to the first target PCI. The payload of the second random access response message may provide an indication to the UE of a successful response to the PCI selection procedure initiated by the first random access response message. The payload of the second random access response message may be carried via the PDSCH. In some aspects, the payload of the second random access response message may be received by the UE within the monitor window. The monitor window may begin after transmission of the first random access response message. In the context of FIG. 8, the base station 804, at 814, may transmit a second random access response message.

At 1306, the base station may monitor for an uplink signal from the UE. For example, 1306 may be performed by monitor component 1444 of apparatus 1402. The base station may monitor for the uplink signal from the UE to complete the PCI selection procedure. In the context of FIG. 8, the base station 804, at 816, may monitor for an uplink signal from the UE 802.

At 1308, the base station may receive the uplink signal from the UE. For example, 1308 may be performed by uplink component 1446 of apparatus 1402. The base station may receive the uplink signal from the UE in response to transmitting the second random access response message. In some aspects, the uplink signal may comprise a PUCCH or a PUSCH. In some aspects, the UE may stop monitoring a source PCI and releases a link to the source PCI upon transmission of the uplink signal to the first target PCI. In the context of FIG. 8, the base station 804, at 818, may receive the uplink signal from the UE 802.

At 1310, if the second random access response message is not received by the UE within a monitor window, the base station may receive a retransmission of the first random access response message. For example, 1310 may be performed by $1^{st}$ random access component 1440 of apparatus 1402. The base station may receive the retransmission of the first random access response message from the UE. In some aspects, the first random access response message may be retransmitted up to a maximum number of times until success in order to perform the PCI selection procedure. In some aspects, if the first random access response message is retransmitted for the maximum number of times the UE may perform a conditional handover procedure if the first target PCI satisfies a conditional handover threshold. In the context of FIG. 8, the base station 804, at 820, may receive a retransmission of the first random access response message if the second random access response message is not received by the UE within a monitor window.

Figure 14:
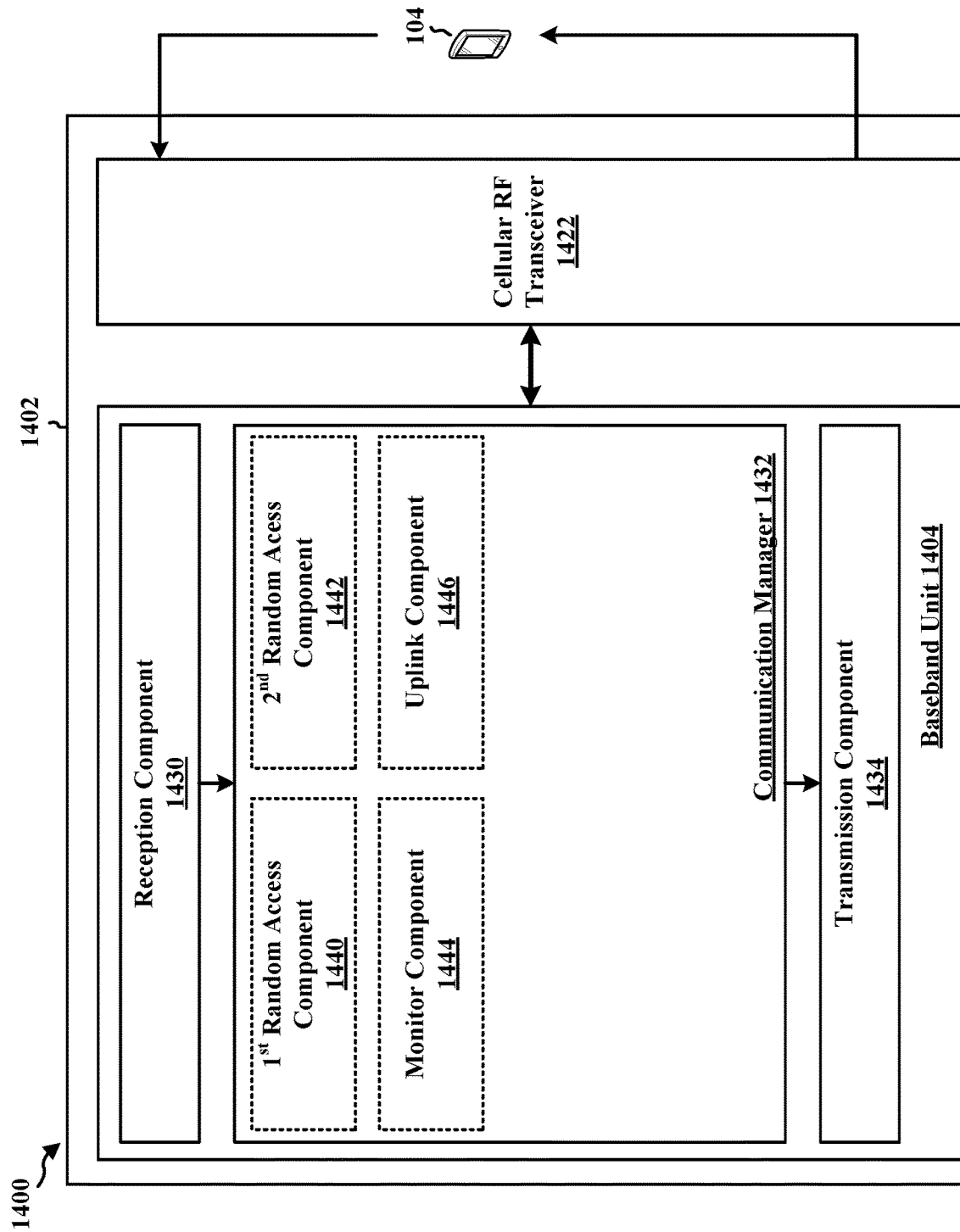
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a $1^{st}$ random access component 1440 that is configured to receive a first random access response message for a first target PCI, e.g., as described in connection with 1202 of FIG. 12 or 1302 of FIG. 13. The $1^{st}$ random access component 1440 may be configured to receive a retransmission of the first random access response message, e.g., as described in connection with 1310 of FIG. 13. The communication manager 1432 further includes a $2^{nd}$ random access component 1442 that is configured to transmit a second random access response message, e.g., as described in connection with 1204 of FIG. 12 or 1304 of FIG. 13. The communication manager 1432 further includes a monitor component 1444 that is configured to monitor for an uplink signal from the UE, e.g., as described in connection with 1206 of FIG. 12 or 1306 of FIG. 13. The communication manager 1432 further includes an uplink component 1446 that is configured to receive the uplink signal from the UE, e.g., as described in connection with 1308 of FIG. 13.

The apparatus may include additional components that perform each of the blocks of the algorithm in the flowcharts of FIG. 12 or 13. As such, each block in the flowcharts of FIG. 12 or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for receiving, from a UE, a first random access response message for a first target PCI to initiate a PCI selection procedure. The apparatus includes means for transmitting, to the UE, a second random access response message from the first target PCI. The apparatus includes means for monitoring for an uplink signal from the UE to complete the PCI selection procedure. The apparatus further includes means for receiving the uplink signal from the UE in response to transmitting the second random access response message. The apparatus further includes means for receiving, from the UE, a retransmission of the first random access response message. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to determine at least one target PCI in preparation of performing a PCI selection procedure; select a first target PCI that meets a threshold to initiate the PCI selection procedure; transmit a first random access response message to the first target PCI; and monitor for a second random access response message from the first target PCI.

Aspect 2 is the apparatus of aspect 1, further includes a transceiver coupled to the at least one processor.

Aspect 3 is the apparatus of any of aspects 1 and 2, further includes that the first random access response message comprises a preamble and a payload, wherein the payload is carried via a PUSCH, wherein the payload comprises an assigned C-RNTI for the first target PCI.

Aspect 4 is the apparatus of any of aspects 1-3, further includes that the second random access response message comprises a PDCCH and a PDSCH on a cell associated with the first target PCI.

Aspect 5 is the apparatus of any of aspects 1-4, further includes that the at least one processor is further configured to receive the second random access response message from the first target PCI within a monitor window, the second random access response message comprising a DCI and a payload wherein the payload is carried via PDSCH; and transmit an uplink signal to the first target PCI upon receipt of the second random access response message.

Aspect 6 is the apparatus of any of aspects 1-5, further includes that the DCI of the second random access response message includes an assigned C-RNTI for the first target PCI, wherein the DCI serves as handshake message from the first target PCI.

Aspect 7 is the apparatus of any of aspects 1-6, further includes that the DCI of the second random access response message is within a PDCCH associated with the first target PCI.

Aspect 8 is the apparatus of any of aspects 1-7, further includes that the DCI of the second random access response message schedules a transmission of the uplink signal to the first target PCI.

Aspect 9 is the apparatus of any of aspects 1-8, further includes that the payload of the second random access response message provides an indication to the UE of a successful response to the PCI selection procedure initiated by the first random access response message.

Aspect 10 is the apparatus of any of aspects 1-9, further includes that the payload of the second random access response message is carried via the PDSCH.

Aspect 11 is the apparatus of any of aspects 1-10, further includes that the payload of the second random access response message is received by the UE within the monitor window, wherein the monitor window begins after transmission of the first random access response message.

Aspect 12 is the apparatus of any of aspects 1-11, further includes that the uplink signal comprises a PUCCH or a PUSCH.

Aspect 13 is the apparatus of any of aspects 1-12, further includes that the UE stops monitoring a source PCI and releases a link to the source PCI upon transmission of the uplink signal to the first target PCI.

Aspect 14 is the apparatus of any of aspects 1-13, further includes that the at least one processor is further configured to determine that the second random access response message from the first target PCI is received within a monitor window.

Aspect 15 is the apparatus of any of aspects 1-14, further includes that if the second random access response message from the first target PCI is not received within the monitor window, the at least one processor is further configured to continue to monitor a source PCI; and re-initiate the PCI selection procedure by retransmitting the first random access response message to the first target PCI.

Aspect 16 is the apparatus of any of aspects 1-15, further includes that the UE maintains a link with the source PCI.

Aspect 17 is the apparatus of any of aspects 1-16, further includes that the first random access response message is retransmitted up to a maximum number of times until success in order to perform the PCI selection procedure.

Aspect 18 is the apparatus of any of aspects 1-17, further includes that the UE informs the source PCI of a failure of the PCI selection procedure, if the first random access response message is retransmitted for the maximum number of times.

Aspect 19 is the apparatus of any of aspects 1-18, further includes that the UE performs a conditional handover procedure if the first target PCI satisfies a conditional handover threshold.

Aspect 20 is the apparatus of any of aspects 1-19, further includes that each serving cell comprises a plurality of PCIs for RRHs, wherein the RRHs are at different physical locations.

Aspect 21 is the apparatus of any of aspects 1-20, further includes that each serving cell comprises a single PCI.

Aspect 22 is a method of wireless communication for implementing any of aspects 1-21.

Aspect 23 is an apparatus for wireless communication including means for implementing any of aspects 1-21.

Aspect 24 is a computer-readable medium storing computer executable code, where the code when executed by a processor causes the processor to implement any of aspects 1-21.

Aspect 25 is an apparatus for wireless communication at a base station including at least one processor coupled to a memory and configured to receive, from a UE, a first random access response message for a first target PCI to initiate a PCI selection procedure; transmit, to the UE, a second random access response message from the first target PCI; and monitor for an uplink signal from the UE to complete the PCI selection procedure.

Aspect 26 is the apparatus of aspect 25, further includes a transceiver coupled to the at least one processor.

Aspect 27 is the apparatus of any of aspects 25 and 26, further includes that the first random access response message comprises a preamble and a payload, wherein the payload is carried via a PUSCH, wherein the payload comprises an assigned C-RNTI for the first target PCI.

Aspect 28 is the apparatus of any of aspects 25-27, further includes that the second random access response message comprises a PDCCH and a PDSCH on a cell associated with the first target PCI.

Aspect 29 is the apparatus of any of aspects 25-28, further includes that the second random access response message comprising a DCI and a payload wherein the payload is carried via PDSCH.

Aspect 30 is the apparatus of any of aspects 25-29, further includes that the DCI of the second random access response message includes an assigned C-RNTI for the first target PCI, wherein the DCI serves as handshake message from the first target PCI.

Aspect 31 is the apparatus of any of aspects 25-30, further includes that the DCI of the second random access response message is within a PDCCH associated with the first target PCI.

Aspect 32 is the apparatus of any of aspects 25-31, further includes that the DCI of the second random access response message schedules a transmission of the uplink signal to the first target PCI.

Aspect 33 is the apparatus of any of aspects 25-32, further includes that the payload of the second random access response message provides an indication to the UE of a successful response to the PCI selection procedure initiated by the first random access response message.

Aspect 34 is the apparatus of any of aspects 25-33, further includes that the payload of the second random access response message is carried via the PDSCH.

Aspect 35 is the apparatus of any of aspects 25-34, further includes that the payload of the second random access response message is received by the UE within a monitor window, wherein the monitor window begins after transmission of the first random access response message.

Aspect 36 is the apparatus of any of aspects 25-35, further includes that the at least one processor is further configured to receive the uplink signal from the UE in response to transmitting the second random access response message.

Aspect 37 is the apparatus of any of aspects 25-36, further includes that the uplink signal comprises a PUCCH or a PUSCH.

Aspect 38 is the apparatus of any of aspects 25-37, further includes that the UE stops monitoring a source PCI and releases a link to the source PCI upon transmission of the uplink signal to the first target PCI.

Aspect 39 is the apparatus of any of aspects 25-38, further includes that if the second random access response message is not received by the UE within a monitor window, the at least one processor is further configured to receive, from the UE, a retransmission of the first random access response message.

Aspect 40 is the apparatus of any of aspects 25-39, further includes that the first random access response message is retransmitted up to a maximum number of times until success in order to perform the PCI selection procedure.

Aspect 41 is the apparatus of any of aspects 25-40, further includes that if the first random access response message is retransmitted for the maximum number of times the UE performs a conditional handover procedure if the first target PCI satisfies a conditional handover threshold.

Aspect 42 is the apparatus of any of aspects 25-41, further includes that each serving cell comprises a plurality of PCIs for RRHs, wherein the RRHs are at different physical locations.

Aspect 43 is the apparatus of any of aspects 25-42, further includes that each serving cell comprises a single PCI.

Aspect 44 is a method of wireless communication for implementing any of aspects 25-43.

Aspect 45 is an apparatus for wireless communication including means for implementing any of aspects 25-43.

Aspect 46 is a computer-readable medium storing computer executable code, where the code when executed by a processor causes the processor to implement any of aspects 25-43.

What is claimed is:
1. An apparatus for wireless communication at a user equipment (UE), comprising:

a memory; and at least one processor coupled to the memory and configured to:

determine at least one target physical cell identifier (PCI) in preparation of performing a PCI selection procedure;

select a first target PCI that meets a threshold to initiate the PCI selection procedure;

transmit a first random access response message to the first target PCI;

monitor for a second random access response message from the first target PCI;

receive the second random access response message from the first target PCI within a monitor window, the second random access response message comprising a downlink control information (DCI) and a payload carried via physical downlink shared channel (PDSCH), the DCI of the second random access response message including an assigned cell radio network temporary identifier (C-RNTI) for the first target PCI, and the DCI serving as a handshake message from the first target PCI; and transmit an uplink signal to the first target PCI upon receipt of the second random access response message.

2. The apparatus of claim 1, further comprising a transceiver coupled to the at least one processor.

3. The apparatus of claim 1, wherein the first random access response message comprises a preamble and a second payload, wherein the second payload is carried via a physical uplink shared channel (PUSCH), wherein the second payload comprises a respective assigned cell radio network temporary identifier (C-RNTI) for the first target PCI.

4. The apparatus of claim 1, wherein the second random access response message comprises a physical downlink control channel (PDCCH) and the physical downlink shared channel (PDSCH) on a cell associated with the first target PCI.

5. The apparatus of claim 1, wherein the DCI of the second random access response message is within a physical downlink control channel (PDCCH) associated with the first target PCI.

6. The apparatus of claim 1, wherein the DCI of the second random access response message schedules a transmission of the uplink signal to the first target PCI.

7. The apparatus of claim 1, wherein the payload of the second random access response message provides an indication to the UE of a successful response to the PCI selection procedure initiated by the first random access response message.

8. The apparatus of claim 7, wherein the payload of the second random access response message is carried via the PDSCH.

9. The apparatus of claim 7, wherein the payload of the second random access response message is received by the UE within the monitor window, wherein the monitor window begins after transmission of the first random access response message.

10. The apparatus of claim 1, wherein the uplink signal comprises a physical uplink control channel (PUCCH) or a physical uplink shared channel (PUSCH).

11. The apparatus of claim 1, wherein the at least one processor is further configured to:

determine that the second random access response message from the first target PCI is received within a monitor window.

12. The apparatus of claim 11, wherein if the second random access response message from the first target PCI is not received within the monitor window, the at least one processor is further configured to:

continue to monitor a source PCI; and re-initiate the PCI selection procedure by retransmitting the first random access response message to the first target PCI.

13. The apparatus of claim 12, wherein the UE maintains a link with the source PCI.

14. The apparatus of claim 12, wherein the first random access response message is retransmitted up to a maximum number of times until success in order to perform the PCI selection procedure.

15. The apparatus of claim 14, wherein the UE informs the source PCI of a failure of the PCI selection procedure, if the first random access response message is retransmitted for the maximum number of times.

16. The apparatus of claim 15, wherein the UE performs a conditional handover procedure if the first target PCI satisfies a conditional handover threshold.

17. The apparatus of claim 1, wherein each serving cell comprises a plurality of PCIs for remote radio headers (RRHs), wherein the RRHs are at different physical locations.

18. The apparatus of claim 1, wherein each serving cell comprises a single PCI.

19. A method of wireless communication at a user equipment (UE), comprising:

determining at least one target physical cell identifier (PCI) in preparation of performing a PCI selection procedure;

selecting a first target PCI that meets a threshold to initiate the PCI selection procedure;

transmitting a first random access response message to the first target PCI;

monitoring for a second random access response message from the first target PCI;

receiving the second random access response message from the first target PCI within a monitor window, the second random access response message comprising a downlink control information (DCI) and a payload carried via physical downlink shared channel (PDSCH), the DCI of the second random access response message including an assigned cell radio network temporary identifier (C-RNTI) for the first target PCI, and the DCI serving as a handshake message from the first target PCI; and transmitting an uplink signal to the first target PCI upon receipt of the second random access response message.

20. An apparatus for wireless communication at a base station, comprising:

a memory; and at least one processor coupled to the memory and configured to:

receive, from a user equipment (UE), a first random access response message for a first target PCI to initiate a PCI selection procedure;

transmit, to the UE, a second random access response message from the first target PCI, the second random access response message comprising a downlink control information (DCI) and a payload carried via physical downlink shared channel (PDSCH), the DCI of the second random access response message including an assigned cell radio network temporary identifier (C-RNTI) for the first target PCI, and the DCI serving as a handshake message from the first target PCI; and monitor for an uplink signal from the UE to complete the PCI selection procedure.

21. The apparatus of claim 20, further comprising a transceiver coupled to the at least one processor.

22. The apparatus of claim 20, wherein the first random access response message comprises a preamble and a second payload, wherein the second payload is carried via a physical uplink shared channel (PUSCH), wherein the payload comprises respective assigned cell radio network temporary identifier (C-RNTI) for the first target PCI.

23. The apparatus of claim 20, wherein the second random access response message comprises a physical downlink control channel (PDCCH) and the physical downlink shared channel (PDSCH) on a cell associated with the first target PCI.

24. The apparatus of claim 20, wherein the at least one processor is further configured to:

receive the uplink signal from the UE in response to transmitting the second random access response message.

25. The apparatus of claim 20, wherein if the second random access response message is not received by the UE within a monitor window, the at least one processor is further configured to:

receive, from the UE, a retransmission of the first random access response message.

26. An apparatus for wireless communication at a user equipment (UE), comprising:

a memory; and at least one processor coupled to the memory and configured to:

determine at least one target physical cell identifier (PCI) in preparation of performing a PCI selection procedure;

select a first target PCI that meets a threshold to initiate the PCI selection procedure;

transmit a first random access response message to the first target PCI;

monitor for a second random access response message from the first target PCI;

receive the second random access response message from the first target PCI within a monitor window, the second random access response message comprising a downlink control information (DCI) and a payload wherein the payload is carried via physical downlink shared channel (PDSCH); and transmit an uplink signal to the first target PCI upon receipt of the second random access response message, wherein the UE stops monitoring a source PCI and releases a link to the source PCI upon transmission of the uplink signal to the first target PCI.

* * * * *